July 28, 1953 J. A. PERRY 2,646,945
AIRPLANE WING STRUCTURE
Filed Sept. 5, 1950 2 Sheets-Sheet 1

INVENTOR.
John A. Perry.
BY Willard S. Grout

July 28, 1953           J. A. PERRY           2,646,945
AIRPLANE WING STRUCTURE
Filed Sept. 5, 1950           2 Sheets-Sheet 2

INVENTOR.
John A. Perry.
BY
Willard S. Grome

Patented July 28, 1953

2,646,945

UNITED STATES PATENT OFFICE 2,646,945

AIRPLANE WING STRUCTURE

John A. Perry, Phoenix, Ariz.

Application September 5, 1950, Serial No. 183,381

8 Claims. (Cl. 244—40)

This invention pertains to improvements in aeroplane wing structures and is particularly directed to mechanism for conveying air flowing over an airfoil section, from the upper surface to the lower surface of the wing so as to improve the lift and braking characteristics of the wing of the aeroplane.

One of the objects of this invention is to provide funnel shaped passageways with the large end of the passageway opening at the top surface of the wing and with the lower end of the funnel shaped passageway being of reduced cross section and projecting downwardly below the lower surface of the wing where it is subjected to the slip stream from the motion of the plane.

Another object of this invention is to provide in a wing structure cited above a flap mechanism associated therewith for increasing the velocity of flow of the air along the under surface of the wing and past the reduced end openings of the funnel shaped passageways so as to create additional vacuum conditions along the upper surface of the wing during flight.

It is also an object of this invention to provide funnel shaped passageways interconnecting the upper and lower surfaces of a wing in which the lower reduced end of the passageway may be withdrawn into the wing to form a smooth continuous lower surface of the wing or lowered into the slip stream below the lower surface of the wing to function in transferring the air from the upper surface of the wing to the lower surface and to also function as a flap or brake on the aeroplane wings structure.

Further features and advantages of this invention will appear from a detailed description of the drawings in which.

Figure 1:
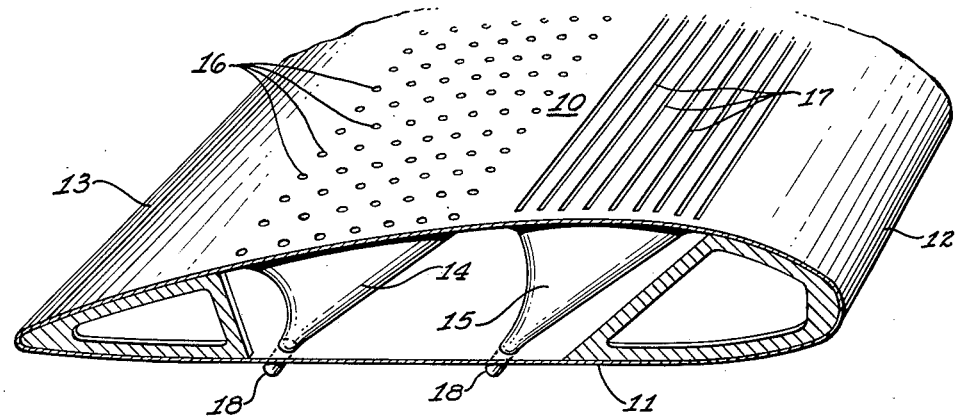
Fig. 1 is a schematic top perspective view of an air-foil section incorporating the features of this invention.
Figure 2:
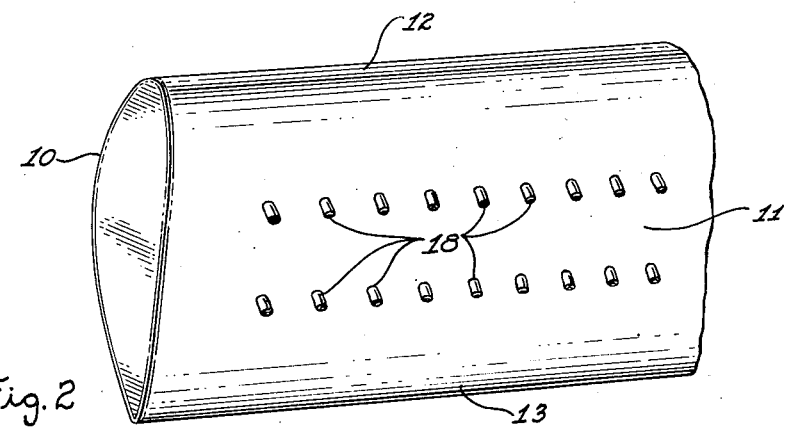
Fig. 2 is a fragmentary perspective underside view of the wing of Fig. 1.

For exemplary purposes this invention is shown applied to a typical airfoil section, Fig. 1, having the top surface 10 and the bottom surface 11 which terminate in the leading edge 12 and the trailing edge 13 in a well known manner. The primary object of this invention is to provide a series of funnel shaped passageways 14 and 15 which terminate with their larger ends in the top surface of the wing either in a series of holes or other similar openings 16 or in a series of slots as at 17. The lower ends of these funnel shaped passageways terminate in reduced openings 18 which it is to be carefully noted, project outwardly toward the rear of the wing and below the lower surface 11 of the wing. Applicant has found that by having the discharge openings 18 below the lower surface 11 of the wing a high degree of efficiency is obtained in transferring air from the upper surface 10 of the wing to the lower area below the surface 11 of the wing to increase the vacuum conditions above the upper surface of the wing and thereby increase its lift efficiency.

Figure 3:
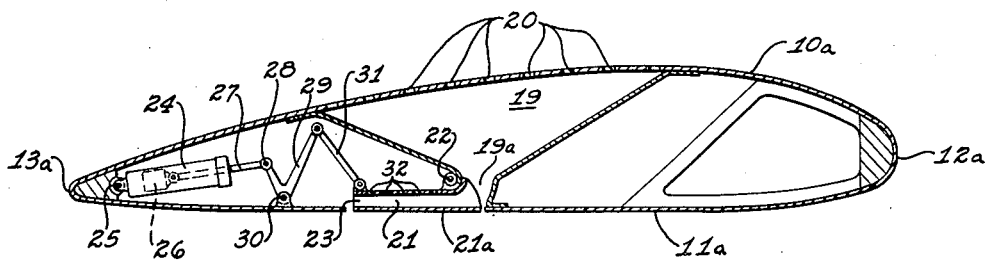
Fig. 3 is a modification of the structure of Fig. 1 showing in section an arrangement for withdrawing the discharge end of the funnel shaped passageways into the lower surface of the wing.
Figure 4:
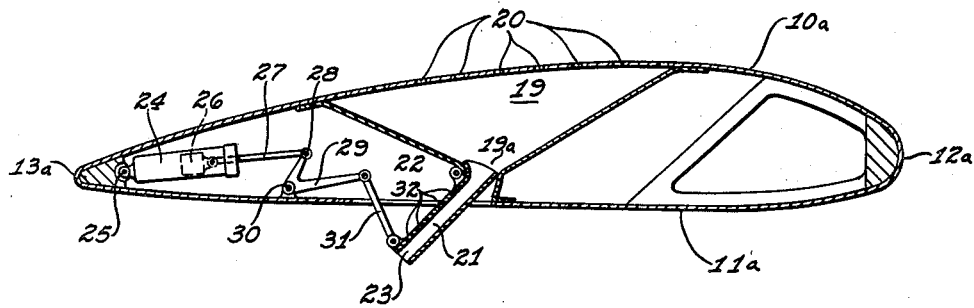
Fig. 4 is a view similar to Fig. 3 but showing the reduced end portions of the funnel shaped passageways extended into operative position in the slip stream below the lower wing surface.

In the arrangement shown in Fig. 3 there is again utilized a wing having a cross section consisting of the top surface 10a and the lower surface 11a terminating in the leading edge 12a and the trailing edge 13a. In this case the funnel shaped passageway 19 communicating through suitable openings 20 with the upper surface 10a of the wing cross section, converges to a reduced opening at 19a where it communicates with the swinging nozzle or discharge pipe 21 which is suitably pivotally connected at 22 to the wing structure. In normal flight the discharge pipe 21 having the reduced end opening 23 is swung up under the wing as in Fig. 3, so that its lower surface 21a is flush and forms a continuous surface with the lower surface 11a of the wing. A suitable actuating means such as a hydraulic cylinder 24 pivotally mounted by a suitable connection at 25 on the wing structure and having a piston 26 and a piston rod 27 connected by a suitable pin 28 to a lever arm 29 in turn pivotally mounted on a pin 30 fixed to the wing section, is connected in turn through a link 31 to the outer end of the swinging discharge pipe 21. Thus when fluid pressure is applied in the cylinder 24 in one direction the pipe is swung up flush with the bottom surface of the wing as in Fig. 3. When fluid pressure is applied in the opposite direction in the cylinder 24 the pipe member 21 may be swung outwardly to any desired position to the full extended position finally shown in Fig. 4. In the latter position it may function efficiently as a restrictive flap to the air flow under the wing to effect a braking action for landings.

It is also to be noted that the efficiency of the discharge suction from the pipe 21 may be improved in certain cases by providing openings such as at 32 in the trailing edge of the pipe 21 so as to increase suction efficiency from the slip stream flowing along the lower edge of the wing.

Fig. 5 again shows the wing section comprising the top surface 10b and the lower surface 11b terminating in the leading edge 12b and terminating at the rear in the trailing edge 13b. In this arrangement there is again provided the funnel shaped passageways such as 33 which have their larger upper ends opening through suitable passageways 34 in the upper surface 10b of the wing and terminating in a reduced end portion 35 projecting downwardly below the wing structure. Associated with these openings 35 are a pair of flaps 36 and 37 both of which are suitably pivotally mounted at 38 on a suitable supporting bracket 39 formed integral with the wing structure. The front flap 36 is connected to be actuated by a suitable hydraulic cylinder 40 through a piston rod 41 and the pivotal connection of the piston rod at 42 to the outer end of the flap 36. The rear flap 37 is actuated by a second hydraulic cylinder 43 suitably connected through its piston rod 44 and the pivotal connection 45 to the rear flap.

Figure 5:
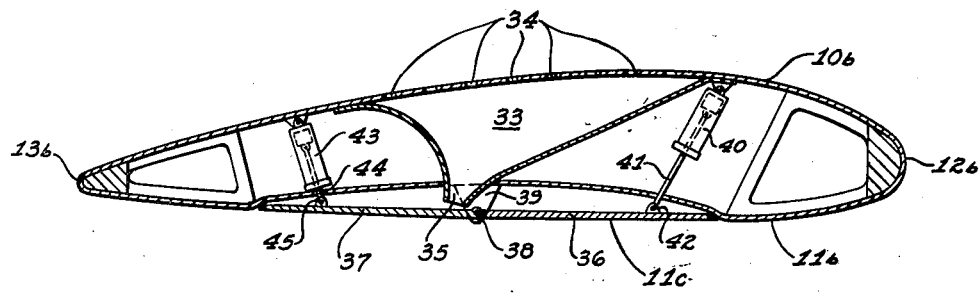
Fig. 5 is a schematic cross section showing the funnel shaped passageways associated with a wing having a flap arrangement on its lower surface.
Figure 6:
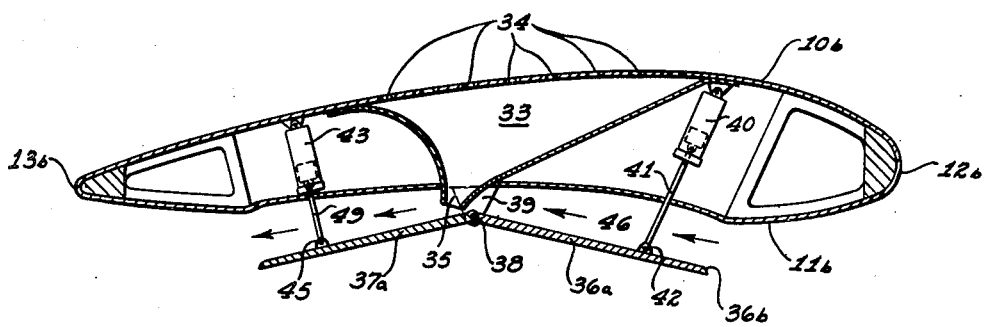
Fig. 6 is a view similar to Fig. 5 but showing the flap in operation.

As seen in Fig. 5 when both of the fluid pressure cylinders 40 and 43 are so actuated as to withdraw the flaps 36 and 37 upwardly they form a continuous surface 11c cooperating with the lower surface 11b of the wing to form a smooth unobstructed undersurface for the wing in normal flight. When it is desired to modify the lift with reduced speed of the plane the fluid pressure cylinders are actuated to move the flaps 36 and 37 to the respective positions 36a and 37a whereupon the front leading edge 36b forms a flap structure to force air with increased velocity through the passageway now formed at 46. Thus a very greatly increased flow of air is provided past the reduced ends 35 of the funnel shaped passageways 36 so as to greatly increase their efficiency in drawing air from upper surface 10b of the wing and discharging it out through the openings 35 where it passes out over the rear flap 37a at increased velocity.

Applicant has therefore provided an improved airfoil section for an airplane wing in which a funnel shaped passageway intercommunicates between the upper and lower surfaces of the wings by an arrangement in which the reduced end portion of the funnel shaped passageway projects outwardly and downwardly below the normal lower surface of the wing. It is also to be noted that there has been provided in conjunction with such a passageway arrangement, flap means for increasing the flow of air past said extended lower openings to increase the efficiency of operation of the device.

Having thus fully set forth and described this invention what is claimed as new and desired to be secured by United States Letters Patent is:

1. In an airplane wing having a top surface and a bottom surface terminating in leading and trailing edges, funnel shaped tubes formed in said wing having upper large open ends located in said upper surface of said wing and small open ends projecting below the lower surface of said wing.

2. In an airplane wing having a top surface and a bottom surface, funnel shaped tubes located in said wing between said surfaces terminating in a larger open end in the top surface of said wing and terminating in a reduced open end projecting below the lower surface of said wing.

3. An airplane wing comprising an upper surface and a lower surface, funnel shaped tubes connected between said upper and lower surfaces comprising larger end openings for said tubes located in the upper surface of said wing, and lower reduced discharge openings for said tubes projecting rearwardly and located below the lower surface of said wing.

4. A wing for an airplane having a top surface and a bottom surface, a funnel shaped tube located between said surfaces having its larger end on the upper surface of said wing and its reduced lower end in communication with a movable discharge pipe, and means for moving said pipe from a position flush with the lower surface of said wing to an extended rearwardly sloping position below the lower surface of said wing.

5. A wing for an airplane having a top surface and a bottom surface, a funnel shaped tube located between said surfaces having its larger end on the upper surface of said wing and its reduced lower end in communication with a movable discharge pipe, and lever means actuatable for moving said pipe from a position parallel with the lower surface of said wing to a downwardly extending rearwardly sloping position below the lower surface of said wing, and fluid pressure motive means connected to said lever means and supported in the trailing edge portion of said wing for actuating said movable discharge pipe to any desired sloping position relative to the lower surface of said wing.

6. In an airplane wing having an upper surface and a lower surface, a funnel shaped tube through said wing between said surfaces having an enlarged upper terminal portion located in said upper surface of said wing, a lower reduced discharge terminal portion on said tube projecting downwardly and located below said lower surface of said wing, and further discharge outlets in said reduced terminal portion facing toward the trailing edge of said wing to further facilitate a suction action in said reduced terminal portion of said tube.

7. In an airplane wing having an upper surface and a lower surface, a funnel shaped tube between said surfaces having its large intake end in the upper surface of said wing and its reduced discharge end projecting downwardly and located below the lower surface of said wing, flap means located below the lower surface of said wing and below said reduced discharge end, and means for moving said flap means relative to said lower surface of said wing and said reduced discharge end so as to apply air at high velocity to said reduced discharge end or to close off the flow of air from said end to form a supplemental continuous lower surface for said wing.

8. In an airplane wing having an upper surface and a lower surface, a funnel shaped tube located obliquely between said surfaces having its enlarged upper intake end in the top surface of said wing, and its lower reduced discharge end projecting downwardly below the lower surface of said wing, a flap means comprising a front flap and a rear flap each pivotally mounted for swinging movement about a horizontal axis at a point adjacent said lower reduced end of said tube, and fluid pressure means carried in said wing and connected to said flap means for swinging said flap means relative to the lower surface of said wing so as to create a venturi suction cavity adjacent said reduced discharge end of said tube or for withdrawing said flap means up against said lower surface of said wing to cover said reduced discharge end from exposure to the slip stream and to form a continuous surface on the underside of said wing.

JOHN A. PERRY.

References Cited in the file of this patent

UNITED STATES PATENTS

| Number | Name | Date |
|---|---|---|
| 1,513,241 | Harding | Oct. 28, 1924 |
| 1,559,091 | Hall | Oct. 27, 1925 |
| 1,630,938 | Griffin | May 31, 1927 |
| 1,809,721 | Miller | June 9, 1931 |
| 2,075,817 | Loerke | Apr. 6, 1937 |
| 2,553,443 | Davis | May 15, 1951 |

FOREIGN PATENTS

| Number | Country | Date |
|---|---|---|
| 573,555 | Great Britain | Nov. 26, 1945 |